United States Patent
Vayntraub

[11] Patent Number: 5,975,694
[45] Date of Patent: Nov. 2, 1999

[54] CONTACT LENS AND METHOD FOR MAKING THE SAME

[75] Inventor: Michael M. Vayntraub, Rochester, N.Y.

[73] Assignee: Bausch & Lomb Incorporated, Rochester, N.Y.

[21] Appl. No.: 08/882,622

[22] Filed: Jun. 25, 1997

Related U.S. Application Data

[60] Provisional application No. 60/021,069, Jul. 1, 1996.

[51] Int. Cl.[6] .................................................. G02C 7/04
[52] U.S. Cl. ........................ 351/160 R; 351/160 H; 351/177
[58] Field of Search .................... 351/160 R, 160 H, 351/161–162, 177

[56] References Cited

U.S. PATENT DOCUMENTS

| | | | |
|---|---|---|---|
| 3,937,566 | 2/1976 | Townsley | 351/40 |
| 4,765,728 | 8/1988 | Porat et al. | 351/160 |
| 4,883,350 | 11/1989 | Muckenhirn | 351/160 |
| 4,995,714 | 2/1991 | Cohen | 351/161 |
| 5,054,905 | 10/1991 | Cohen | 351/161 |
| 5,436,678 | 7/1995 | Carroll | 351/161 |
| 5,452,031 | 9/1995 | Ducharme | 351/177 |
| 5,650,838 | 7/1997 | Roffman et al. | 351/177 |

FOREIGN PATENT DOCUMENTS

0742462A2  11/1996  European Pat. Off. .......... G02C 7/04

*Primary Examiner*—Georgia Epps
*Assistant Examiner*—Jordan M. Schwartz
*Attorney, Agent, or Firm*—Chris P. Konkol

[57] ABSTRACT

The present invention relates to a contact lens having a back side comprising a central zone and a peripheral zone located about the central zone, wherein the peripheral zone has a surface defined by at least one of a sine or cosine function. Systems and methods for making such lenses are also provided.

6 Claims, 1 Drawing Sheet

CONTACT LENS AND METHOD FOR MAKING THE SAME

This application claims benefit of provisional application Ser. No. 60/021,069 filed Jul. 01, 1996.

FIELD OF THE INVENTION

The present invention relates to a contact lens having a back side comprising a central zone and a peripheral zone located about the central zone, wherein the peripheral zone includes a surface defined by at least one of a sine or cosine function. Systems and methods for making such lenses are also described.

BACKGROUND

As a practical matter, the eye is not spherical. Thus, in order to improve the fit and performance of contact lenses, lenses commonly include multiple surfaces. For example, many lens designs include a central zone with a periphery zone located about the circumference of the central zone. The term "zone" is intended to describe an area of the lens which may comprise a single or multiple surfaces. The central zone is designed primarily for vision correction, whereas the periphery zone is commonly designed primarily for fit. Specific examples of such lenses are provided in the following patents, each of which is incorporated herein by way of reference. U.S. Pat. No. 4,883,350 to Muchenhirn discloses a contact lens having a back side including a spherically shaped central zone with an aspherically shaped periphery zone. U.S. Pat. No. 4,765,728 to Porat et al. discloses a lens having a back side including central and peripheral zones both having surfaces described by non-spherical second-order surfaces of revolution (i.e. non-spherical conic functions such as an ellipse, parabola and hyperbola). U.S. Pat. No. 5,436,678 to Carroll discloses a multifocal lens wherein the back side of the lens includes a central zone surrounded circumferencially by a marginal zone, which is surrounded circumferencially by a periphery zone. Each zone has a shape defined by a non-spherical conic function. U.S. Pat. No. 5,452,031 to Ducharme discloses a central optic zone with a peripheral zone defined by splines (piecewise polynomials linked to one another).

With lenses including multiple surfaces, it is often desirable to have adjacent surfaces be tangent with one another along their points of intersection. For example, the adjacent zones on the back side of the lens can be connected along common points which are tangent with the surfaces of the adjacent zones, as is described in the aforementioned references. By making adjacent zones tangent with one another, the transitions between zones are relatively smooth (junctionless), thus improving comfort, vision properties, and manufacturability.

In addition to the number and shape of surfaces on a lens, other lens design parameters must also be considered in making lenses, e.g. overall lens diameter, central zone diameter, sagital depth, lens power, base curve, axial edge lift, etc. Axial lift is the distance between a point on the back side of the lens (measured parallel to the lens major axis) at a specific diameter and a theoretical vertex sphere. The theoretical vertex sphere is a sphere having a radius equal to the lens base curve of radius.

Although many lenses designs are known, new and simplified approaches continue to be sought.

SUMMARY OF THE INVENTION

The present invention relates to a contact lens having a back side comprising a central zone and a peripheral zone located about the central zone, wherein the peripheral zone includes at least one surface defined as at least one of a sine or cosine function. Systems and methods for making such lenses are also provided.

The present invention includes a method for making lenses which is capable of addressing the aforementioned design parameters, while being less computationally demanding than other approaches, such as the use of splines. For example, due to the predictable nature of sine and cosine functions, the interval length between nodes can be increased, thus reducing the overall number of curves (surfaces) on the lens. Furthermore, because of the periodic nature of sine and cosine functions, multiple curves may be linked to one another by common points wherein only the first derivatives of the curves are equivalent. Thus, unlike the use of splines, the second derivative need not be determined. Accordingly, the design of the lens is less computationally demanding. Other advantages will be apparent from the detailed description provided below.

DETAILED DESCRIPTION OF THE INVENTION

Figure 1:
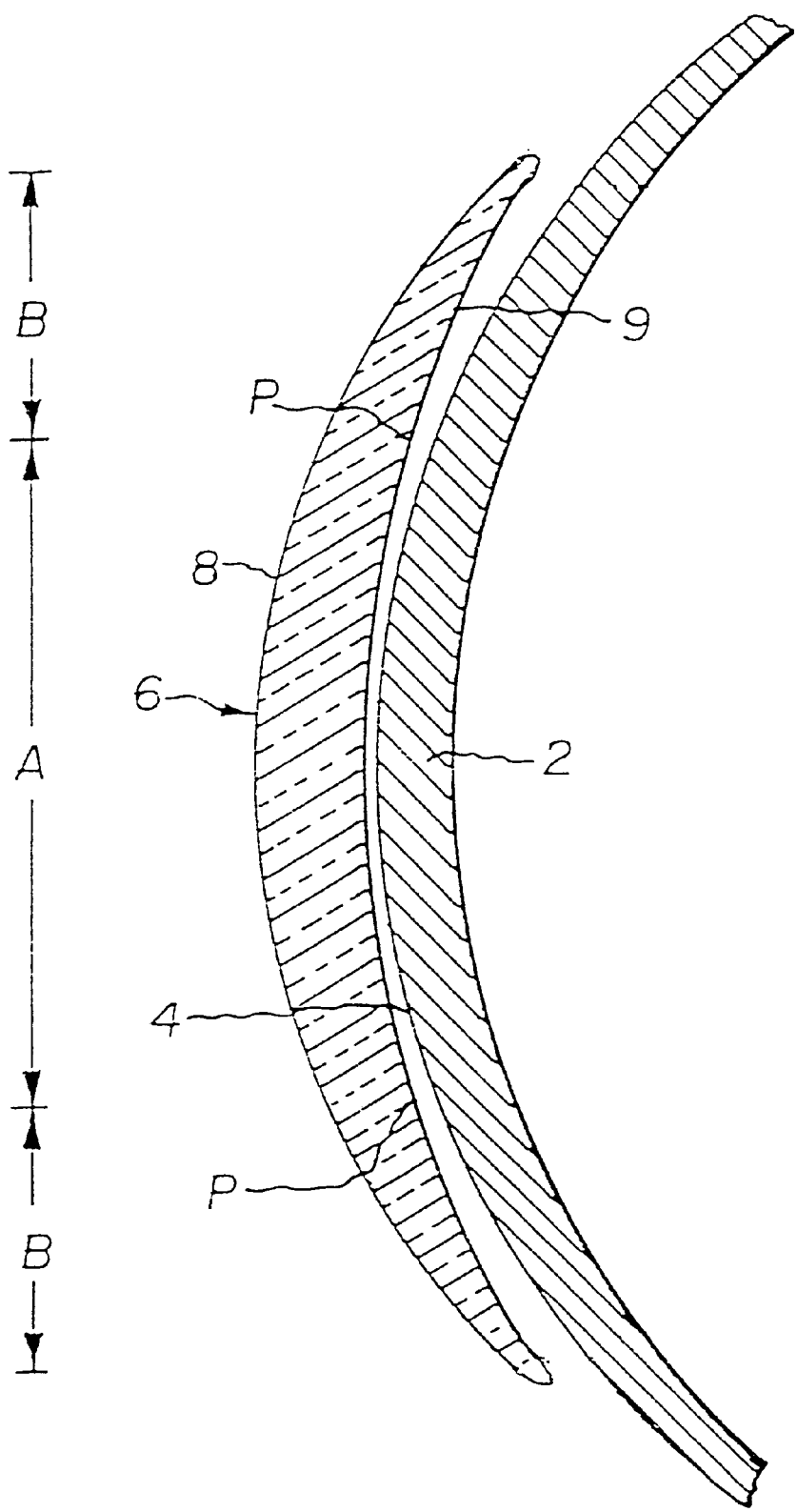
FIG. 1 is an enlarged cross-sectional view showing the fit between a cornea and a contact lens of the present invention.

The present invention is directed toward contact lenses and includes: introcular lenses, scleral lenses, and corneal lenses. Such lenses may include hard, rigid gas permeable, and soft lenses, although a preferred embodiment of the invention relates to rigid gas permeable (RGP) lenses including those produced from fluoro silicone acrylate materials.

The contact lenses of the present invention may be made using a variety of well known methods including various molding and lathe cutting techniques. In a preferred embodiment, lenses are cut from contact lens blanks, or "buttons" (such as Boston ES™ from Polymer Technology), using a CNC lathe system. Such lathe systems include a data processing system capable of calculating curves corresponding to a desired lens surface, typically based upon inputted lens design parameters. A description of such a system is provided in U.S. Pat. No. 5,452,031 to Ducharme, which is incorporated herein by reference. With such systems, an operator typically inputs lens design parameters into the system by way of an input means (e.g. such as a keyboard, disk, modem, or other similar means used to download information to a processing unit). Using the inputted lens design parameters, a central processing unit (or similar means) calculates a lens surface using a set of pre-programmed algorithms. Once the shape of the lens is defined, a corresponding surface is cut into the lens button by way of a computer driven lathe.

Referring to FIG. 1., there is provided a cross-sectional view of a cornea (2) with its surface (4) adjacent to the back surface of a contact lens (6). The lens (6) includes a front side (8) and back side (9). The back side (9) has a central zone (A) and a peripheral zone (B). Although not critical to the subject invention, the front side (8) of the lens (6) may include one or more surfaces which may be defined as spherical or aspherical functions, as is well known in the art.

The surface of the central zone (A) of the back side (9) of the lens is not necessarily limited to a given shape but is preferably defined as a conic section, i.e. a second-order surface of revolution such as an ellipse, parabola, hyperbola, or sphere. Preferred conics include those having eccentricity values of about 0.0 to about 0.9. In preferred embodiments of the present invention, the central zone comprises a single focal optic zone; however, the central zone may be designed to be multi-focal, as is described in U.S. Pat. No. 5,436,678. Although the diameter of the central zone may vary and will depend upon the overall lens diameter as well as other lens design parameters, the central zone typically has a diameter of from about 6.0 to about 9.5 mm.

The peripheral zone (B) is located about the circumference of the central zone and extends radially outward to the edge of the lens. The peripheral zone (B) comprises at least one surface which is defined as at least one of a sine or cosine function, an example of which is provided by the following formulae:

$$y = A \sin(x+B) + C \quad (1)$$

$$y = A \cos(x+B) + C \quad (2)$$

wherein: x is the linear distance from the center of the lens, y is the sagital depth of the lens at a given x value, and A, B, and C are coefficients. Values for x typically range from about 2.5 to about 6 mm. Values for y depend upon a number of variables including the base curve of radius, eccentricity, chord length, etc., but typically range in value of from about 0.8 to 2.5 mm.

Although the peripheral zone may comprise a single surface, the zone preferably comprises a plurality of sequentially concentric surfaces wherein at least one, but preferably all the surfaces are defined as sine or cosine functions. More specifically, several individual surfaces, or intervals, are preferably linked end-to-end. The intervals may be of the same axial length, but they need not be. The points at which sequential intervals are linked are preferably tangent. That is, the interface or union between immediately adjacent intervals is tangent with both intervals. Furthermore, in preferred embodiments, the outermost points of the central zone and the inner most points of the peripheral zone are connected along common points (P) which are tangent with both zones. The condition of tangency between the various surfaces prevents abrupt transitions therebetween. Abrupt transitions between surfaces can cause problems relating to vision, comfort and manufacturability of the lens.

Although not limited to the following specifications, lenses of the present invention are preferably provided with a base curve of radius of from about 6.5 to about 8.5 mm, generally with 0.05 incremental steps. The base curve of radius preferably has a surface defined as an ellipse having eccentricity value of from about 0.025 to about 0.900. Overall lens diameters are preferably from about 8.50 to about 13.0, with 0.10 incremental steps, with the central zone having a diameter from about 6.0 to about 9.5 mm.

By way of specific example, a representative lens may be described by the following parameters: an overall lens diameter of 8.90 mm, a central zone having an optical zone diameter of 7.5 mm and having a single conic surface having an eccentricity value of 0.0, a base curve radius of 7.8 mm; and a peripheral zone having five concentric intervals each tangent with the adjacent interval, and each being defined as a function represented by:

$$y = A \sin(x+B) + C$$

wherein A, B, C, axial lift, and lens diameter for each interval are and provided below in Table I.

TABLE I

| Interval of Peripheral Zone | 1 | 2 | 3 | 4 | 5 |
|---|---|---|---|---|---|
| Outer Diameter of Interval (mm) | 7.80 | 8.00 | 8.30 | 8.60 | 8.90 |
| Axial lift at Outer Diameter of Interval | 0.005 | 0.015 | 0.030 | 0.057 | 0.080 |
| Coefficient A | 0.5926 | 0.6517 | 0.8054 | 1.3469 | 2.1265 |
| Coefficient B | −3.3606 | −3.2242 | −4.9549 | −3.0066 | −5.6964 |
| Coefficient C | 0.7356 | 0.6323 | 1.7461 | −0.0602 | 3.3295 |

The present invention is not limited to the details of the illustrative embodiments provided herein. This invention may be embodied in other specific forms without departing from its essential attributes. The present embodiments are therefore to be considered as illustrative and not restrictive.

What is claimed is:

1. A contact lens having a posterior side comprising a central zone and a peripheral zone surrounding the central zone, wherein said lens is characterized by the peripheral zone including a plurality of concentric surfaces wherein each concentric surface is defined by a sine or cosine function and are connected along common tangent points wherein the central and peripheral zones are connected along common points tangent to both zones, and wherein the sine and cosine functions are, respectively, represented by the formulae:

$$y = A \sin(x+B) + C \quad (1)$$

$$y = A \cos(x+B) + C \quad (2)$$

wherein: x is a linear distance from the center of the lens, y is the sagital depth of the lens at a given x value, and A, B, and C are coefficients.

2. The contact lens of claim 1 wherein the peripheral zone includes five sequential concentric surfaces wherein each concentric surface is defined by a sine function.

3. The contact lens of claim 1 wherein the surface of the central zone is defined by an ellipse.

4. The contact lens of claim 1 wherein the surface of the central zone is defined by a sphere.

5. A system for making contact lenses comprising:
   (a) a data processing system comprising:
       an input means for receiving data representing lens design parameters, and
       means for defining the shape of a posterior side of a contact lens based upon the lens design parameters, wherein the shape comprises a central zone and a periphery zone surrounding the central zone, said peripheral zone having a surface defined by at least one of a sine or cosine function; and
   (b) a lathe connected to the data processing system for cutting a lens corresponding to the defined shape,
wherein the sine and cosine functions are, respectively, represented by the formulae:

$$y = A \sin(x+B) + C \quad (1)$$

$$y = A \cos(x+B) + C \quad (2)$$

wherein: x is a linear distance from the center of the lens, y is the sagital depth of the lens at a given x value, and A, B, and C are coefficients.

6. A method for making contact lenses comprising the steps of:
   (a) providing data representing lens design parameters;

(b) defining a shape based upon the lens design parameters wherein the shape comprises a central zone and a periphery zone surrounding the central zone, said peripheral zone having a surface defined by at least one of a sine or cosine function; and (c) cutting a lens surface corresponding to the defined shape, wherein the sine and cosine functions are, respectively, represented by the formulae:

$$y = A \sin(x+B) + C \tag{1}$$

$$y = A \cos(x+B) + C \tag{2}$$

wherein: x is a linear distance from the center of the lens, y is the sagital depth of the lens at a given x value, and A, B, and C are coefficients.

* * * * *